United States Patent [19]

Fukumoto et al.

[11] Patent Number: 5,039,553

[45] Date of Patent: Aug. 13, 1991

[54] MIXED BATCHWISE AND CONTINUOUS PROCESS FOR THE PRODUCTION OF COBALT MODIFIED MAGNETIC IRON OXIDE POWDER FOR USE IN HIGH DENSITY RECORDING

[75] Inventors: Yuji Fukumoto; Kazuyoshi Matsumoto; Yasushi Matsui, all of Yokohama, Japan

[73] Assignee: Showa Denko K.K., Tokyo, Japan

[21] Appl. No.: 503,640

[22] Filed: Apr. 3, 1990

[30] Foreign Application Priority Data

Apr. 4, 1989 [JP] Japan .................................. 1-85162

[51] Int. Cl.$^5$ ............................................. B05D 5/12
[52] U.S. Cl. .................................. 427/127; 427/217; 252/62.56; 423/633; 148/105
[58] Field of Search ............... 427/127, 217, 405, 436; 252/62.56; 423/633, 634; 148/105

[56] References Cited

U.S. PATENT DOCUMENTS

| | | | |
|---|---|---|---|
| 4,066,565 | 1/1978 | Sasazawa et al. | 252/62.56 |
| 4,069,164 | 1/1978 | Dezawa et al. | 427/127 |
| 4,267,207 | 5/1981 | Sasazawa et al. | 427/127 |
| 4,296,149 | 10/1981 | Rudolf et al. | 427/127 |
| 4,363,831 | 12/1982 | Umeki et al. | 427/127 |
| 4,414,245 | 11/1983 | Miyazawa et al. | 427/127 |
| 4,457,955 | 7/1984 | Okamura et al. | 427/127 |
| 4,539,261 | 9/1985 | Nakata et al. | 427/127 |
| 4,594,267 | 6/1986 | Honma et al. | 427/127 |
| 4,851,258 | 7/1989 | Kuroyama et al. | 427/127 |
| 4,857,417 | 8/1989 | Kitaoka et al. | 252/62.56 |

FOREIGN PATENT DOCUMENTS

| | | | |
|---|---|---|---|
| 146100 | 6/1985 | European Pat. Off. | 423/634 |
| 50-37667 | 4/1975 | Japan | 252/62.56 |
| 58-161927 | 9/1983 | Japan . | |
| 2125021 | 2/1984 | United Kingdom | 252/62.56 |

*Primary Examiner*—Shrive Beck
*Assistant Examiner*—Terry J. Owens
*Attorney, Agent, or Firm*—Sughrue, Mion, Zinn Macpeak & Seas

[57] ABSTRACT

A process for the continuous production of cobalt-modified magnetic iron oxide. This process comprises carrying out a batchwise preliminary cobalt treatment by adding a magnetic iron oxide powder to an alkaline solution followed by the addition of a cobalt salt to cover the magnetic iron oxide powder with cobalt. A cobalt modification reaction is carried out continuously by passing the solution containing the preliminary cobalt-treated magnetic iron oxide powder under heat and pressure through a flow-type reaction vessel.

7 Claims, 1 Drawing Sheet

MIXED BATCHWISE AND CONTINUOUS PROCESS FOR THE PRODUCTION OF COBALT MODIFIED MAGNETIC IRON OXIDE POWDER FOR USE IN HIGH DENSITY RECORDING

BACKGROUND OF THE INVENTION (1) Field of the Invention

The present invention relates to the production of a magnetic powder for use in the magnetic recording. More particularly, the present invention relates to a process and apparatus for the continuous production of a cobalt-modified magnetic iron oxide powder by which a high-density recording is made possible.

(2) Description of the Related Art

As an example of the process for the production of cobalt-modified magnetic iron oxide particles, there can be mentioned a process comprising dispersing magnetic iron oxide particles in an alkaline solution and adding a cobalt salt along or together with another component such as a ferrous salt to the dispersion to form cobalt modified magnetic iron oxide particles. According to this process, a cobalt-containing layer is formed on surfaces of magnetic iron oxide particles and the magnetic characteristics are improved. For example, the coercive force and the saturation magnetization per unit weight are increased. The thus-obtained cobalt-modified iron oxide particles are very suitable as the magnetic powder for magnetic recording.

The conventional process for the preparation of such a cobalt-modified magnetic iron oxide powder for the high-density recording is a batchwise process in which the whole reaction is completed in one reaction vessel.

This conventional batchwise process is defective in that the reaction time is very long and the operation efficiency is low.

SUMMARY OF THE INVENTION

A primary object of the present invention is to overcome the defects of the conventional technique and provide a process in which a cobalt-modified magnetic iron oxide powder is prepared in a short time, and an apparatus for use in carrying out this process.

The inventors made an intensive investigation of the reactions in the production of a cobalt-modified magnetic iron oxide powder, with a view to attaching the foregoing object, and as a result found that there is a great difference in the reaction speed of the cobalt modification reaction and of the ferrous salt modification reaction.

Namely, the reaction speed of the cobalt modification reaction is relatively high if a small amount of cobalt is added, and as the amount of cobalt is increased, the reaction time is exponentially prolonged. On the other hand, the ferrous salt modification reaction has a very high reaction speed. Accordingly, to obtain cobalt-modified magnetic iron oxide having a high coercive force and a good coercive force distribution, the reaction must be conducted for a long time.

In view of status of the foregoing reactions, the inventors conducted various experiments, using test tubes, to developed a process capable of shortening the reaction time as much as possible, and as a result, found that if the cobalt modification reaction alone is carried out under high temperature and elevated pressure conditions to shorten the reaction time, and the other reaction is carried out continuously to the cobalt modification reaction, the reaction can be carried out very efficiently and completed in a short time. The present invention is based on this finding.

More specifically, in accordance with the present invention, there is provided a process for the continuous production of cobalt-modified magnetic iron oxide, which comprises carrying out a batchwise preliminary cobalt treatment of adding a magnetic iron oxide powder to an alkaline solution and adding a cobalt salt to the resulting dispersion to cover the magnetic iron oxide powder with cobalt, carrying out a cobalt modification reaction by passing the solution containing the preliminarily cobalt-treated magnetic iron oxide powder under heating and pressure through a flow-type reaction vessel, and, if necessary, after the cobalt modification reaction, batchwise adding a ferrous salt to the solution containing the cobalt-modified magnetic iron oxide powder to effect a ferrous modification reaction.

Furthermore, in accordance with the present invention, there is provided an apparatus for the continuous production of cobalt-modified magnetic iron oxide, which comprises a batch-type reaction vessel for carrying out a preliminary cobalt treatment of a magnetic iron oxide powder in an alkaline solution, a flow-type reaction vessel arranged continuously to the batch-type reaction vessel to effect a cobalt modification reaction by passing the solution containing the preliminarily cobalt-treated magnetic oxide powder under heating and pressure therethrough, and optionally, a batch-type reaction vessel arranged continuously downstream of the flow-type reaction vessel to effect a ferrous modification reaction.

According to the present invention, a cobalt modification reaction is carried out in a high-temperature and high-pressure state by utilizing a flow-type reaction vessel for the cobalt modification of $\gamma$-iron oxide particles, and therefore, the reaction time can be greatly shortened and a continuous production of a magnetic iron oxide powder for the magnetic recording becomes possible.

Furthermore, by adopting this continuous reaction system, the process becomes industrially very advantageous, and the prepared magnetic powder has excellent magnetic characteristics, coercive force distribution and temperature characteristics.

DESCRIPTION OF THE PREFERRED EMBODIMENTS

Figure 1:
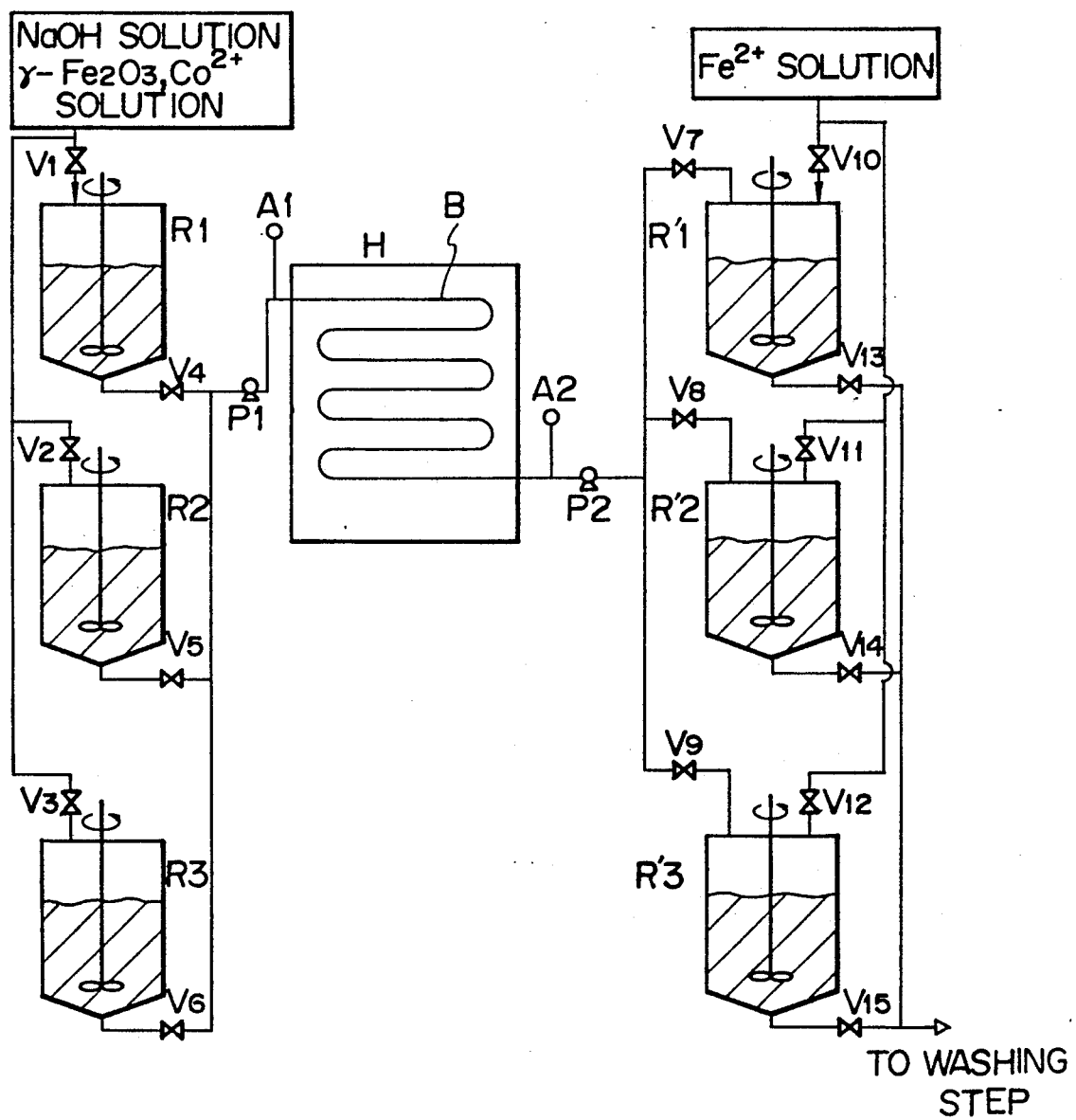
FIG. 1 is a diagram illustrating an embodiment of the apparatus for the continuous production of a magnetic iron oxide powder for magnetic recording, as used for working the present invention.

As pointing out above, for the production of a magnetic iron oxide powder for magnetic recording, a preliminary cobalt treatment is first carried out, then a cobalt modification treatment is carried out, and a ferrous modification treatment is further conducted. In the conventional process, these reaction treatments are carried out batchwise by using one reaction tank.

In contrast, in the process for the production of a magnetic iron oxide powder according to the present invention, the cobalt modification treatment reaction, which has a low reaction speed among the foregoing reactions, is completed in a short time, whereby it is made possible to conduct all of the reaction in a continuous manner.

The preliminary cobalt treatment is carried out for obtaining a uniform covering distribution of $Co^{2+}$. A batch-type reaction vessel is used for this treatment, magnetic iron oxide particles are dispersed in an alkaline solution and a cobalt salt is further added to the dispersion to form a slurry. As the magnetic iron oxide, there can be used $\gamma\text{-}Fe_2O_3$, $Fe_3O_4$ and Berthollide (an intermediate between $\gamma\text{-}Fe_2O_3$ and $Fe_3O_4$). Note, a ferrous modification reaction can be effected at this stage by adding a ferrous salt simultaneously with the cobalt salt.

The conditions for this reaction are not particularly critical. For example, the reaction is carried out at a temperature of 90° to 105° C., and NaOH concentration of 1 to 5N and a $Co/\gamma\text{-}Fe_2O_3$ weight ratio of from 0.02 to 0.10 for a reaction time of 0.5 to 2 hours. KOH can be used instead of NaOH, but the use of $NH_4OH$ is not preferable. To carry out the reaction in a continuous manner, preferably at least two simple batch-type reaction vessels are used to conduct the reaction for a short time.

The starting slurry obtained by the preliminary cobalt treatment is subjected to the cobalt modification treatment. In this reaction, if the amount of $Co^{2+}$ is large (more than 3.0% by weight), the reaction time is long (50 to 100 hours or more) in the batchwise reaction, the production amount is limited, and the production efficiency is low. To solve this problem, according to the present invention, a flow-type reaction vessel in which the reaction temperature and pressure can be elevated and the continuous reaction can be performed is used. If reaction conditions such as a reaction pressure of 1.2 to 15 kg/cm² and a reaction temperature 110° to 200° C, are adopted, a reaction speed of 10 to 100 l/hr can be obtained. If only a shortening of the reaction time is desired, this can be accomplished by using an autoclave, but in this case, it is impossible to carry out the reaction in a continuous manner.

The flow-type reaction vessel comprises a heating device for maintaining a high temperature and a slurry feed pump for maintaining a high-pressure state, and a flow-type tube is arranged in the reaction vessel. An electric heater for directly heating the reaction tube, an isothermal tank filled with a heating medium, or a heat exchanger, can be optionally used as the heating device.

The slurry coming from the flow-type reaction vessel is subjected to a ferrous modification treatment in a batch-type reaction vessel for effecting the ferrous modification. This reaction is carried out by using a batch-type reaction vessel. From the viewpoint of the continuation of the reaction, preferably the reaction is conducted for a short time by using at least two simple batch-type reaction vessels. The reaction conditions are, for example a reaction temperature of 50 to 100° C., a reaction time of 1 to 3 hours, and an $Fe^{2+}/\gamma\text{-}Fe_2O_3$ weight ratio of from 0.01 to 0.10.

The reaction product is then washed and dried to obtain a magnetic iron oxide powder for the magnetic recording.

According to the present invention, the total treatment time is 2 to 6 hours, which is much shorter than the conventional treatment time, which is 9 to 50 hours or more.

EXAMPLES

In the present examples, the apparatus shown in FIG. 1 was used for maintaining the continuity of the reaction.

Two or three batch-type reaction tubes R1 through R3 were used as the preliminary reaction vessel. Within 0.5 hour from the point of initiation of the reaction in the reaction vessel R1, the preliminary reaction was started in the reaction vessel R2. When the reaction vessel R3 was used, the preliminary reaction was similarly started in the reaction vessel R3.

A flow-type reaction vessel H is connected to these preliminary reaction vessels, and two or three reaction vessels R'1 through R'3 were arranged downstream of the flow-type reaction vessel H to maintain the continuity of the ferrous modification reaction. More specifically, while the ferrous modification reaction is being carried out in the vessel R'1, the cobalt-modified slurry was fed at a rate of 15 l/hr into the vessel R'2 from the reaction tube. After the reaction in R'1 was completed and the slurry was transferred into the water washing step, the slurry was charged into R'1. At this point, the reaction was being conducted in R'2. When the vessel R'3 was used, similar procedures were adopted.

Accordingly, in this apparatus, all the steps of the reactions were simultaneously advanced.

Note, in FIG. 1, P1 and P2 represent pumps, A1 and A2 represent pressure gauges, and V1 through V15 represent electromagnetic valves (for automatic control).

EXAMPLE 1

To the preliminary reaction vessel R1 charged with 60 l of a 2.5N aqueous solution of caustic soda was added 10 kg of a $\gamma$-iron oxide powder (having a coercive force of 360 Oe and a saturation magnetization of 74 emu/g) and the powder was throughly dispersed in the solution. Then the temperature of the dispersion was elevated to 100° C., a solution of cobalt chloride was added to the dispersion, and the reaction was conducted for 1 hour.

The obtained slurry was fed at a rate of 15 l/hr under a feed inlet pressure of 3 kg/cm² into the flow-type reaction vessel H (having an inner diameter of 25 mm and a length of 30 m), and the reaction was promoted by elevating the temperature to 120° C..

The slurry was fed in a continuous manner at a rate of 15 l/hr to the ferrous modification batch-type reaction vessel R'1 from the flow-type reaction vessel H, and just after 60 l of the slurry was filled in the reaction vessel R'1, a solution of ferrous chloride was added to the slurry in a nitrogen atmosphere. The temperature was maintained at 70° C. for 1 hour, and then the temperature was elevated to 100° C. and the reaction was conducted for 1 hour, whereby all of the reactions were completed. Then the reaction mixture was washed with water, filtered, and dried to obtain a magnetic powder.

The amount of cobalt of cobalt chloride was 2.5% by weight as the cobalt atom based on $\gamma$-iron oxide and the amount of the ferrous iron was 5.0% by weight as the iron atom based on $\gamma$-iron oxide.

EXAMPLE 2

The continuous operation was carried out in the same manner as described in Example 1 except that the pressure for charging the slurry into the flow-type reaction vessel H was changed to 4 kg/cm², the slurry-charging speed was changed to 30 l/hr, and the inner temperature (reaction temperature) in the flow-type reaction tube was changed to 130° C. The other conditions were the same as described in Example 1. Note the reaction vessels R3 and R'3 were used.

EXAMPLE 3

The continuous operation was carried out in the same manner as described in Example 1 except that the pressure for charging the slurry into the flow-type reaction tube H was changed to 6 kg/cm$^2$, the slurry-charging speed was changed to 60 l/hr, and the inner pressure (reaction temperature) in the flow-type reaction tube was changed to 150° C. The other conditions were the same as described in Example 1.

The magnetic powders obtained in examples 1 through 3 were formed into tapes by using a binder having the following composition, and the magnetic characteristics of the tapes were measured.

| Composition of Binder | |
| --- | --- |
| Magnetic powder | 100 parts |
| Vinyl chloride/ vinyl acetate copolymer (VAGH) | 25 parts |
| Rosin | 3 parts |
| Silicone oil | 1 part |
| Lecithin | 0.2 part |
| Toluene | 150 parts |
| MIBK | 150 parts |

The magnetic characteristic of the magnetic powders and tapes are shown in Table 1.

It is seen that excellent results were obtained in each case.

TABLE 1

| Example No. | Characteristics of Co-$\gamma$-Fe$_2$O$_3$ | | | | Characteristics of Tape | | | |
| --- | --- | --- | --- | --- | --- | --- | --- | --- |
| | Hc (Oe) | Ms (emu/g) | Fe$^{2+}$/$\gamma$ (wt %) | Hcn$_2$/Hc | Hc (Oe) | Br/Bm | O.R. | SFD |
| 1 | 730 | 77.4 | 4.6 | 1.7 | 760 | 0.89 | 2.85 | 0.345 |
| 2 | 700 | 77.0 | 4.3 | 1.8 | 734 | 0.88 | 2.82 | 0.365 |
| 3 | 675 | 76.9 | 4.2 | 2.0 | 701 | 0.85 | 2.81 | 0.379 |

Note:
Hc: coercive force
Ms: saturation magnetization
Fe$^{2+}$/$\gamma$: amount of Fe$^{2+}$ deposited on $\gamma$-Fe$_2$O$_3$
Hcn$_2$: coercive force at liquid nitrogen temperature
Br/Bm: squareness ratio
O.R.: orientation ratio
SFD: inversion magnetic field intensity distribution

We claim:

1. A process for the continuous production of cobalt-modified magnetic iron oxide, which comprises:
   (a) carrying out a batchwise preliminary cobalt treatment by adding a magnetic iron oxide powder to an alkaline solution;
   (b) adding a cobalt salt to the dispersion resulting from step (a) to cover the magnetic iron oxide powder with cobalt; and
   carrying out a cobalt modification reaction by subjecting the solution containing the preliminary cobalt-treated magnetic iron powder from step (b) to pressure and heat of from 110° C. to 200° C. in a flow-type reaction vessel.

2. A process according to claim 1, further comprising:
   (d) adding a ferrous salt batchwise to the solution containing the cobalt modified magnetic iron oxide powder from step (c) to effect a ferrous modification reaction.

3. A process according to claim 1, wherein the preliminary cobalt treatment of step (a) is carried out at a temperature of from 90° C. to 105° C. and at an alkali concentration of 1 to 5N for 0.5 to 2 hours, while maintaining a weight ratio of the cobalt salt to the magnetic iron oxide powder of 0.02 to 0.10.

4. A process according to claim 1, wherein the cobalt modification reaction is carried out at a pressure of 1.2 to 15 kg/cm$^2$ and at a flow rate of 10 to 100 l/hour.

5. A process according to claim 2, wherein the ferrous modification reaction of step (d) is carried out at a temperature of 50° C. to 100° C. for 1 to 3 hours while maintaining a weight ratio of the ferrous salt to the magnetic iron oxide powder of 0.01 to 0.10.

6. A process according to claim 1, wherein the total treatment time from the initiation of step (a), the preliminary cobalt treatment, to the point of termination of step (c), the cobalt modification reaction, is 1 to 3 hours.

7. A process according to claim 2, wherein the total treatment time from initiation of step (a), the preliminary cobalt treatment, to the point of termination of step (d), the ferrous modification reaction, is 2 to 6 hours.

* * * * *